United States Patent [19]
Whited

[11] 4,253,023
[45] Feb. 24, 1981

[54] RADIATION DETECTION SYSTEM USING SEMICONDUCTOR DETECTOR WITH DIFFERENTIAL CARRIER TRAPPING AND MOBILITY

[75] Inventor: Richard C. Whited, Santa Barbara, Calif.

[73] Assignee: The United States of America as represented by the United States Department of Energy, Washington, D.C.

[21] Appl. No.: 29,964

[22] Filed: Apr. 13, 1979

[51] Int. Cl.$^3$ .............................................. G01T 1/24
[52] U.S. Cl. .................................. 250/370; 250/371
[58] Field of Search ................. 250/370, 371; 328/127

[56] References Cited
PUBLICATIONS

Kurz, "A Novel Pulse Processing System for HgI$_2$ Detectors", Nuc. Instr. and Methods, vol. 150, 1978, pp. 91–95.
Jones et al., "Resolution Improvement in CdTe Gamma Detectors Using Pulse-Shape Discrimination", Nuc. Instr. and Methods, vol. 124, 1975, pp. 591–595.
Krapivin et al., "Pulse Selection to Improve Energy Resolution of Gamma Spectrometers with Cadmium Telluride Detectors", Atomic Energy, vol. 43, No. 1, Jul. 1977, pp. 633–636.

*Primary Examiner*—Alfred E. Smith
*Assistant Examiner*—Carolyn E. Fields
*Attorney, Agent, or Firm*—James E. Denny; Dean E. Carlson; John A. Koch

[57] ABSTRACT

A system for obtaining improved resolution in relatively thick semiconductor radiation detectors, such as HgI$_2$, which exhibit significant hole trapping. Two amplifiers are used: the first measures the charge collected and the second the contribution of the electrons to the charge collected. The outputs of the two amplifiers are utilized to unfold the total charge generated within the detector in response to a radiation event.

8 Claims, 8 Drawing Figures $\lambda_e/L = 1, \lambda_h/L = 0.1, S = 9.99$

| A1/B1 | TRUE | LINE | % ERROR |
|---|---|---|---|
| 0.0905 | 9.0954 | 9.0963 | 0.0099 |
| 0.1653 | 8.3475 | 8.3492 | 0.0197 |
| 0.2281 | 7.7191 | 7.7214 | 0.0293 |
| 0.2817 | 7.1837 | 7.1865 | 0.0388 |
| 0.3278 | 6.7221 | 6.7253 | 0.0480 |
| 0.3680 | 6.3200 | 6.3236 | 0.0571 |
| 0.4034 | 5.9667 | 5.9706 | 0.0661 |
| 0.4347 | 5.6538 | 5.6580 | 0.0748 |
| 0.4626 | 5.3747 | 5.3792 | 0.0833 |
| 0.5102 | 4.8983 | 4.9032 | 0.0998 |
| 0.5665 | 4.3361 | 4.3414 | 0.1227 |
| 0.6099 | 3.9015 | 3.9071 | 0.1431 |
| 0.6546 | 3.4557 | 3.4614 | 0.1655 |
| 0.7031 | 2.9713 | 2.9768 | 0.1843 |
| 0.7518 | 2.4866 | 2.4904 | 0.1544 |
| 0.8010 | 2.0050 | 1.9985 | −0.3225 |
| 0.8518 | 1.6144 | 1.5820 | −2.0084 |
| 0.9037 | 1.5229 | 1.5820 | 3.8793 |
| 0.9599 | 1.5460 | 1.5820 | 2.3278 |
| 1.0000 | 1.5820 | 1.5820 | −0.0000 |

C1 = 10.00045, C2 = 1.58198, BREAK POINT, F = 0.84269
RMS ERROR = 1.11269E-02

$\lambda_e/L = 2, \lambda_h/L = 0.2, S = 4.875$ FIGURE 6

| A1/B1 | TRUE | LINE | % ERROR |
|---|---|---|---|
| 0.0911 | 4.5785 | 4.5897 | 0.2449 |
| 0.1305 | 4.3819 | 4.3978 | 0.3634 |
| 0.1664 | 4.2024 | 4.2226 | 0.4792 |
| 0.2297 | 3.8867 | 3.9140 | 0.7020 |
| 0.2578 | 3.7470 | 3.7774 | 0.8089 |
| 0.3078 | 3.4978 | 3.5333 | 1.0130 |
| 0.3513 | 3.2820 | 3.3215 | 1.2035 |
| 0.4067 | 3.0075 | 3.0515 | 1.4611 |
| 0.4529 | 2.7791 | 2.8259 | 1.6812 |
| 0.5040 | 2.5284 | 2.5767 | 1.9079 |
| 0.5555 | 2.2786 | 2.3256 | 2.0638 |
| 0.6047 | 2.0448 | 2.0861 | 2.0178 |
| 0.6503 | 1.8353 | 1.8636 | 1.5413 |
| 0.7021 | 1.6156 | 1.6111 | −0.2763 |
| 0.7540 | 1.4341 | 1.3582 | −5.2904 |
| 0.8005 | 1.3239 | 1.2707 | −4.0169 |
| 0.8500 | 1.2636 | 1.2707 | 0.5651 |
| 0.9021 | 1.2447 | 1.2707 | 2.0966 |
| 0.9546 | 1.2521 | 1.2707 | 1.4929 |
| 1.0000 | 1.2707 | 1.2707 | −0.0000 |

C1 = 5.03392, C2 = 1.27075, BREAK POINT, F = 0.77193
RMS ERROR = 1.92996E-02

$\lambda_e/L = 5, \lambda_h/L = 0.5, S = 1.79$ FIGURE 7

| A1/B1 | TRUE | LINE | % ERROR |
|---|---|---|---|
| 0.0653 | 2.1831 | 2.1962 | 0.5966 |
| 0.1047 | 2.1054 | 2.1255 | 0.9560 |
| 0.1587 | 2.0002 | 2.0289 | 1.4352 |
| 0.2074 | 1.9067 | 1.9417 | 1.8390 |
| 0.2517 | 1.8231 | 1.8625 | 2.1634 |
| 0.3049 | 1.7247 | 1.7672 | 2.4648 |
| 0.3527 | 1.6389 | 1.6816 | 2.6065 |
| 0.4064 | 1.5463 | 1.5855 | 2.5407 |
| 0.4547 | 1.4670 | 1.4990 | 2.1813 |
| 0.5074 | 1.3865 | 1.4049 | 1.3228 |
| 0.5556 | 1.3192 | 1.3185 | −0.0531 |
| 0.6009 | 1.2628 | 1.2375 | −2.0074 |
| 0.6513 | 1.2090 | 1.1472 | −5.1112 |
| 0.7007 | 1.1664 | 1.1033 | −5.4051 |
| 0.7505 | 1.1339 | 1.1033 | −2.6923 |
| 0.8023 | 1.1109 | 1.1033 | −0.6797 |
| 0.8578 | 1.0974 | 1.1033 | 0.5429 |
| 0.9009 | 1.0938 | 1.1033 | 0.8758 |
| 0.9578 | 1.0966 | 1.1033 | 0.6136 |
| 1.0000 | 1.1033 | 1.1033 | −0.0000 |

C1 = 2.31304, C2 = 1.10333, BREAK POINT, F = 0.67581
RMS ERROR = 2.29941E-02

$\lambda_e/L = 5, \lambda_h/L = 0.2, S = 4.84$

| A1/B1 | TRUE | LINE | % ERROR |
|---|---|---|---|
| 0.0914 | 4.5773 | 4.5917 | 0.3157 |
| 0.1310 | 4.3793 | 4.3999 | 0.4702 |
| 0.1673 | 4.1983 | 4.2244 | 0.6224 |
| 0.2006 | 4.0319 | 4.0631 | 0.7721 |
| 0.2598 | 3.7369 | 3.7767 | 1.0637 |
| 0.3107 | 3.4833 | 3.5302 | 1.3441 |
| 0.3550 | 3.2630 | 3.3156 | 1.6124 |
| 0.4117 | 2.9820 | 3.0413 | 1.9895 |
| 0.4592 | 2.7473 | 2.8114 | 2.3324 |
| 0.5118 | 2.4888 | 2.5567 | 2.7278 |
| 0.5553 | 2.2771 | 2.3463 | 3.0394 |
| 0.6002 | 2.0613 | 2.1290 | 3.2846 |
| 0.6507 | 1.8246 | 1.8844 | 3.2800 |
| 0.7020 | 1.5974 | 1.6362 | 2.4344 |
| 0.7530 | 1.3978 | 1.3894 | −0.6025 |
| 0.8036 | 1.2468 | 1.1447 | −8.1923 |
| 0.8540 | 1.1551 | 1.1033 | −4.4841 |
| 0.9060 | 1.1112 | 1.1033 | −0.7115 |
| 0.9514 | 1.0996 | 1.1033 | 0.3418 |
| 1.0000 | 1.1033 | 1.1033 | −0.0000 |

C1 = 5.03392, C2 = 1.10333, BREAK POINT, F = 0.81210
RMS ERROR = 2.72579E-02

FIGURE 8

RADIATION DETECTION SYSTEM USING SEMICONDUCTOR DETECTOR WITH DIFFERENTIAL CARRIER TRAPPING AND MOBILITY

BACKGROUND OF THE INVENTION

The invention described herein was made in the course of or under Contract EY-76-C-08-1183 with the U.S. Department of Energy.

This invention relates to nuclear radiation detectors and more particularly to a system for achieving improved resolution for semiconductor detectors which exhibit differential carrier trapping and mobility, i.e., wherein the mobility of one charge carrier is significantly different than that of the other and the trapping of one is significantly greater than the other. A typical semiconductor material of this type is mercuric iodide ($HgI_2$).

$HgI_2$ belongs to a class of materials generally referred to as semiconductors, but which exhibits characteristics which would be more accurately described by the term "semi-insulator." That is, at room temperature, a crystal of $HgI_2$ will only conduct feeble currents under electrical bias. However, when bombarded by gamma rays, electrically biased thin slices of $HgI_2$ crystals will deliver an electrical charge to an external circuit which is proportional to the energy deposited in the slice by the gamma rays. This combination of properties makes $HgI_2$ ideally suited for use as a room temperature gamma ray spectrometer detector. Existing $HgI_2$ detectors show considerably better gamma ray resolution capability than the widely used room temperature spectrometer detector, sodium iodide scintillators. The resolution of $HgI_2$ detectors is not as good as that of the semiconductor germanium and silicon detectors, but these latter must be operated at liquid nitrogen temperatures which requires the use of bulky and often highly inconvenient cryogenic ancillary apparatus.

Also, the high atomic numbers of the constituents of $HgI_2$ (80 for $H_g$ and 53 for I) and th high density of this material (6.28 g/cm$^3$) confers important advantages in gamma ray interaction efficiency for a given mass and/or volume of detector over commonly used spectrometer detectors, e.g., sodium iodide, germanium, and silicon. Nonetheless, the detection of gamma rays by $HgI_2$ with reasonable efficiency requires a fairly thick detector. For example, to achieve a 90 percent probability of interaction with a gamma-ray photon of 250 KeV energy requires approximately a one-centimeter thickness of $HgI_2$. Since thick $HgI_2$ detectors have heretofore presented difficult resolution problems due to the presence of very significant hole trapping, the above-mentioned advantages of $HgI_2$ have not been fully realized. Unfortunately, an increase in the thickness of $HgI_2$ detectors has been accompanied by a decrease in resolution.

A typical semiconductor detector configuration includes a pair of parallel planar electrode surfaces, one of which is positively biased, the other negatively biased, by an external electrical circuit. The interaction of a high-energy gamma photon within the semiconductor material produces charge carrier pairs, i.e., an equal number of electrons and holes within the detector. The electrons are attracted to the positively biased surface and the holes to the negatively biased surface. However, only a portion of the total charge produced in the detector by a radiation event is actually given up to the external biasing circuit due to the trapping of carriers within the detector.

The charge given up by the detector for each interaction event, i.e., that actually collected by the external biasing circuit, is proportional to the distance through which each carrier (electron or hole) moves as well as the total number of carriers of that type. If some carriers are trapped, the distance through which they move is less, and hence their contribution to the collected charge is less. Considering the total possible charge contribution of an event in the absence of trapping to be unity, the proportion of the charge contribution from each carrier actually collected in a detector which exhibits trapping varies with the depth at which the gamma interaction takes place. The proportion of the total charge collected in $HgI_2$ detectors decreases as the depth of the interaction with respect to the negatively biased surface increases, due to the trapping of holes being much more severe than the trapping of electrons.

The usual methods of collecting charge pulses from spectrometer detectors do not distinguish among gamma interactions at various depths, but merely record together the interactions from all depths. Hence, since the charge collected varies as a function of depth in a thick detector, this usual method of recording pulses degrades the resolution.

One approach to overcoming the deficiencies of prior methods, with the objective of permitting the use of thicker crystals, has been proposed by R. Kurz in a paper entitled "A Novel Pulse Processing System for $HgI_2$ Detectors," presented at the International Workshop on Mercuric Iodide and Cadmium Telluride Nuclear Detectors, Jerusalem, June 7–8, 1977, and published in Nuclear Instruments & Methods, Vol. 150, page 91 (1978). Kurz would obtain improvement over usual $HgI_2$ detection systems by using a pulse shape analyzer to measure the pulse rise time. Pulse rise time depends upon the interaction depth in the detector since the electron charge collection occurs faster than the hole charge collection. Kurz uses the equation $Q_0 = Q(C_1 + C_2 R)$ to electronically correct for differences in the charge collection as a function of detector depth where $Q_0$ is the total charge generated in the interaction, $Q$ is the measured charge collected, $C_1$ and $C_2$ are adjustable constants, and $R$ is proportional to the pulse rise time.

The system of the present invention takes a different approach from that of Kurz to provide certain additional advantages thereover, including a much higher signal to noise ratio with less complicated electronic circuitry.

BRIEF SUMMARY OF THE INVENTION

Accordingly, it is an object of the invention to provide a system for obtaining improved resolution with a semiconductor detector which exhibits differential carrier trapping and mobility.

Briefly summarized, the above and additional objects are accomplished by a system which utilizes a pair of amplifiers to separate the slower hole charge collection from the faster electron charge collection in the detector and then processes together the two charge collections such that the resolution is improved. The first amplifier has relatively short integration and differentiation time constants and therefore only looks for the electron contribution of the charge pulse. The second amplifier has relatively long integration and differentiation time constants and consequently sees the combined electron and hole contribution. The outputs of the two amplifiers are then utilized to unfold the value of the full charge collection.

While the system, according to the invention, provides an improvement in the resolution of semiconductor detectors which exhibit differential carrier trapping and mobility irrespective of detector thickness, the benefits gained through this system increases sharply as the thickness of those detectors increase. For instance, with $HgI_2$ detector crystals produced in accordance with current technology, significant benefits will be obtained in connection with detectors of about 1 mm and greater thickness.

The above-mentioned and additional objects, advantages, and applications of the invention, and a further understanding of the invention will be apparent after consideration of the following description of a preferred embodiment described in conjunction with the accompanying drawings.

BRIEF DESCRIPTION OF THE DRAWINGS

FIG. 4 is a graphical representation of outputs from the circuit of FIG. 1; and

FIGS. 5-8 are compilations of data for various values of the pertinent variables.

DETAILED DESCRIPTION

Figure 1:
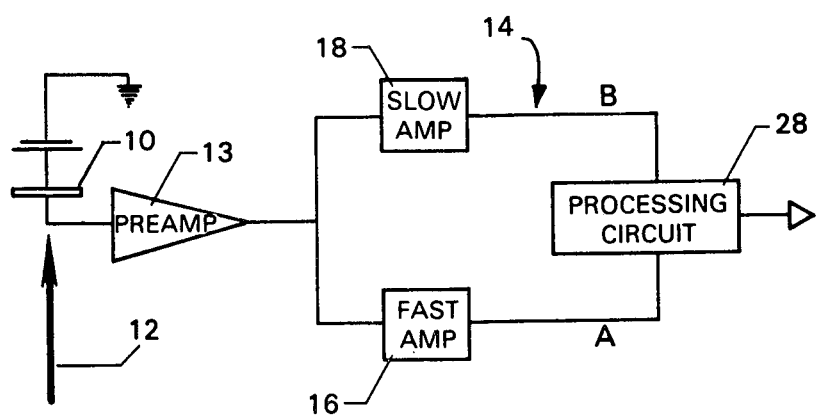
FIG. 1 is a schematic diagram of an electronic circuit for practicing the invention.

Referring now to FIG. 1, semiconductor detector 10 subjected to gamma radiation 12 is incorporated in a charge collection circuit 14. Charge pulses generated in detector 10 in response to gamma events are amplified by preamp 13 and delivered into amplifier circuit 14. A pair of amplifiers, including slow amplifier 16 and fast amplifier 18, are provided in circuit 14 to achieve separation of the electron charge collection from the hole charge collection, respectively. The manner in which this is accomplished will now be examined.

The trapping length, $\lambda$, for either holes, $\lambda_h$, or electrons, $\lambda_e$, within a semiconductor detector corresponds to the relationship.

$$\lambda = \mu \tau E \tag{1}$$

where $\mu$ is the mobility, $\tau$ is the trapping time, and E is the electric field which, of course, would be the same for both electrons and holes. Consider an $HgI_2$ detector with a thickness L of 1 cm within an electric field E of $2 \times 10^4$ V/cm. A typical $HgI_2$ crystal could have a $\mu\tau_e$ value of $10^{-4}$ cm²/V and $\mu\tau_h$ value of $10^{-5}$ cm²/V. The values are, of course, empirically determined for each particular detector crystal. With these values, $\lambda_e = 2$ cm and $\lambda_h = 2$ mm, as equation (1) above indicates.

For any interaction of gammas within the semiconductor at depth x from the negative contact, the charge collected, Q, as a function of total charge generated in the interaction, $Q_0$, is given by $$Q = Q_0 (\lambda_e/L) \{1 - \exp[-(1-x/L)/(\lambda_e/L)]\} + (\lambda_h/L) \{1 - \exp[-(x/L)/(\lambda_h/L)]\} = Q_0 (A + [B-A]) \tag{2}$$

where $$A = (\lambda_e/L) \{1 - \exp[-(1-x/L)/(\lambda_e/L)]\} \tag{3}$$

and $$(B-A) = (\lambda_h/L) \{1 - \exp[-(x/L)/(\lambda_h/L)]\} \tag{4}$$

Figure 2:
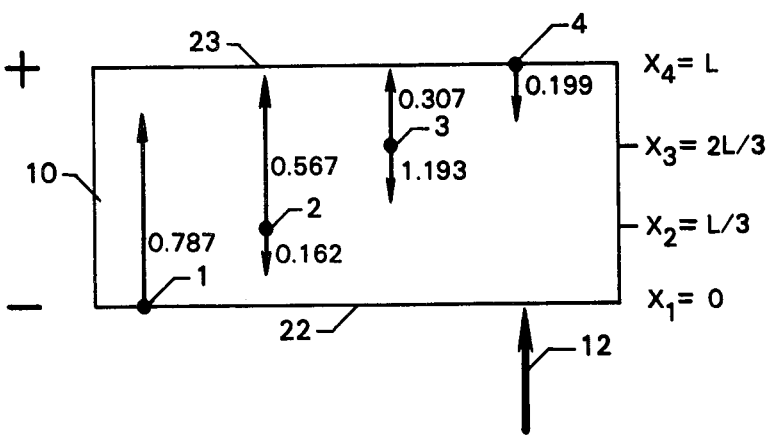
FIG. 2 is a diagrammatic representation of four equal energy gamma events occurring at different depths in a detector.
Figure 3:
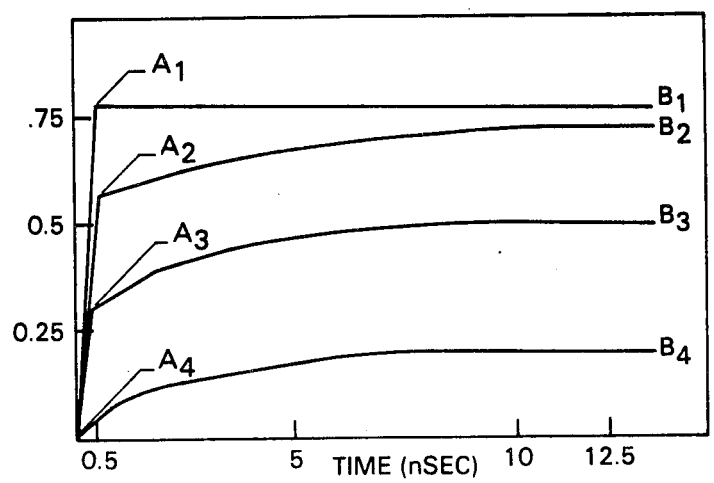
FIG. 3 is a diagrammatic representation of the pulses produced by the events depicted in FIG. 2.

These equations are utilized to derive the values of hole and electron contributions to the collected charge entered in FIGS. 2 and 3. FIG. 2 is a graphical representation of four equal energy gamma ray interactions, 1 through 4, occurring in the detector. Considering the entire depth x of the detector from negatively biased surface 22 to positively biased surface 23 as L, the four depicted gamma interactions occur at $X_1 = 0$, $X_2 = L/3$, $X_3 = 2L/3$, and $X_4 = L$. The arrows leading away from the position mark for each event represent the charge collected for both electrons and holes. The number next to each up arrow gives the proportion of full charge collection contributed by the electrons, and the number next to each down arrow gives the proportion of full charge collection contributed by the holes. Obviously, if full charge collection were realized, the contribution of the electron plus the contribution of the hole would have to add up to unity for each event.

FIG. 3 gives the pulse rise time out of preamplifier 13, the collected charge as a fraction of the total charge being plotted as a function of time for each of these same four events. Electronic noise has been ignored for the sake of clarity. The pulse rise time curves show the effect of both electron and hole trapping. The fraction of electron contribution (up arrows in FIG. 2 and steep slope in FIG. 3) is the quantity A from the above equations, the fraction of hole contribution (down arrows in FIG. 2 and shallow slopes in FIG. 3) is $B-A$, and the total fractional (collected) contribution is B.

For any given event, the charge collected, Q, is just $Q = Q_0 B$, whence it follows that the total charge liberated, $Q_0$, is $$Q_0 = Q(1/B) \tag{5}$$

Since the measured total charge is Q, if one can simultaneously determine B, then the desired total charge $Q_o$ can be immediately determined. It has been found that B can be derived from separated measurements of the electron and total charge contributions, illustrated in FIGS. 2 and 3, in accordance with the invention.

The invention involves using two different amplifiers, 16 and 18 in FIG. 1, to permit measurement of these two charge contributions. Fast amplifier 16 has short integration and differentiation time constants and, hence, measures only the electron contribution, $Q_oA$. Amplifier 18, on the other hand, has long time constants and measures the combined electron and hole contribution, $Q_oB$. A simple gain adjustment of the amplifiers at an "X=O" event equalizes the amplifier outputs.

Figures 4, 5:
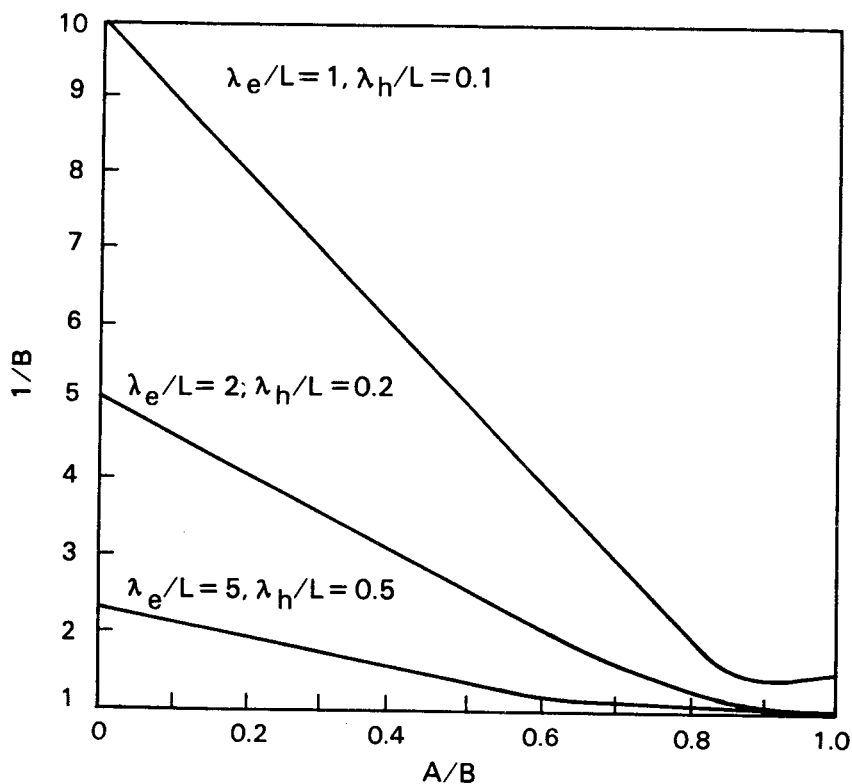

FIG. 4 displays 1/B versus A/B, as derived from Eqs. (2)-(4) for various values of $\lambda_e/L$ and $\lambda_h/L$. These factors may be obtained through the processing of the outputs of amplifiers 16 and 18 in an appropriate electronic processing circuit 28. The factor 1/B is the correction factor which permits the conversion of the measured collected charge, Q, to the total charge liberated in an absorption event, $Q_0$, while A and B are the outputs of amplifiers 16 and 18, respectively. The A/B ratio may be generated by conventional analog or digital techniques in circuit 28. Empirically, these curves are remarkably well fit by two straight lines whose equations are:

$$1/B = C_1 - S(A/B), 0 \leq (A/B) \leq F \quad (6)$$
$$= C_2, F \leq (A/B) \leq 1$$

where $$1/C_1 = (\lambda_h/L) \, 1 - \exp[-1/(\lambda_h/L)]$$

$$1/C_2 = (\lambda_e/L) \, 1 - \exp[-1/(\lambda_e/L)]$$

$$F = (C_1 - C_2)/S$$

and S is an arbitrary constant ($\simeq L/\lambda_h$) adjustable for a best fit to the theoretical curve. Once A and B have been electronically generated, their values may be used to process an equation similar to Equation (6). Processing circuitry 28 may be a microprocessor-based system under software control, an analog system which stretches the pulses and processes them in an analog manner to generate Equation (6), or similar equation, or other convenient electric circuitry.

FIGS. 5 through 8 show the uniformity of the straightline fit ("Line") of Equation (6) to the theoretical ("True") curve for various values of $\lambda_e/L$ and $\lambda_h/L$, with empirically derived optimum values of S in each case. The rms error of the fit is, in all cases, less than 3 percent. While this degree of fit indicates that particular empirical Equation (6) would provide satisfactory results in most cases, other empirical equations can be derived which would also provide satisfactory results in particular circumstances.

As indicated above, the system of the invention has significant advantages over the pulse rise time method developed by R. Kurz and reported in the above-identified paper. One advantage is that a much higher signal-to-noise ratio is achieved using the two tuned amplifiers in accordance with the invention as compared to the signal-to-noise ratio for obtaining rise time information. Another advantage is that $\tau_h>$ hole transit time is not required with the system of the invention. This statement is equivalent to $\lambda_h > L$. In other words, the Kurz method is restricted to thicknesses equal to or less than the trapping length of the holes, whereas this restriction does not apply to the system according to the invention. Another advantage is that electronic construction is simpler for this system.

The degree to which the system, according to the invention, improves the resolution of semiconductor detectors depends primarily upon the crystalline uniformity of the detector. An improvement in resolution by a factor greater than 2 over commonly used systems can be realized using $HgI_2$ detectors of a crystalline uniformity reported in the current scientific literature. Greater improvements in resolution will be obtained with improvements in crystalline uniformity. While the foregoing description of a preferred embodiment is primarily directed to $HgI_2$ crystals, it will be apparent to those skilled in the art that the invention has general application to semiconductor detectors wherein the mobility of the electrons is significantly different from that of the holes and the trapping of one carrier is significantly greater than that of the other. By way of example, the invention will have significant application to CdTe detectors, particularly as the crystalline uniformity of those detectors improves.

While the fundamental novel features of the invention have been shown and described and pointed out as applied to particular embodiments by way of example, it will be appreciated by those skilled in the art that various omissions, substitutions, and changes may be made within the principle and scope of the invention as expressed in the appended claims.

What I claim is:

1. In a system for measuring nuclear radiation utilizing a semiconductor detector, the apparatus comprising:
   (a) a first means electrically connected to said detector for producing an output representative of the total charge given up by said detector in response to a radiation event therewithin,
   (b) a second means electrically connected to said detector for producing an output representative of the contribution of one of the charge carriers to said total charge given up, and
   (c) means for processing the outputs of said first and second means for obtaining a measure of the total charge produced within said detector in response to said radiation event.

2. The apparatus of claim 1 wherein said detector comprises at least a portion of a $HgI_2$ crystal.

3. The apparatus according to claim 1 wherein said detector exhibits differential carrier mobility and trapping.

4. The apparatus of claim 3 wherein said detector is a slice of a $HgI_2$ crystal thicker than about 1 mm.

5. A method for measuring nuclear radiation utilizing a semiconductor detector comprising:
   (a) measuring the total charge given up by said detector in response to a radiation event therewithin,
   (b) measuring the contribution of one of the charge carriers to said total charge given up, and
   (c) processing said measured total charge given up and one charge carrier contribution to obtain a measure of the total charge produced within said detector in response to said radiation event.

6. The method of claim 5 wherein said detector comprises at least a portion of a $HgI_2$ crystal.

7. The method according to claim 5 wherein said detector exhibits differential carrier mobility and trapping.

8. The method of claim 7 wherein said detector is a slice of a $HgI_2$ crystal thicker than about 1 mm.

* * * * *